(12) United States Patent
Reyes et al.

(10) Patent No.: US 9,004,168 B2
(45) Date of Patent: Apr. 14, 2015

(54) TREATMENT FLUIDS COMPRISING A SILICATE COMPLEXING AGENT AND METHODS FOR USE THEREOF

(75) Inventors: Enrique A. Reyes, Duncan, OK (US); Alyssa L. Smith, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 273 days.

(21) Appl. No.: 13/444,883

(22) Filed: Apr. 12, 2012

(65) Prior Publication Data

US 2013/0269936 A1    Oct. 17, 2013

(51) Int. Cl.
*E21B 43/16* (2006.01)
*C09K 8/72* (2006.01)
*C09K 8/74* (2006.01)

(52) U.S. Cl.
CPC ... *C09K 8/74* (2013.01); *C09K 8/72* (2013.01); *E21B 43/16* (2013.01)

(58) Field of Classification Search
CPC ........... E21B 43/16; E21B 43/00; C09K 8/74; C09K 8/72
USPC .......................................... 166/279, 270, 271
See application file for complete search history.

(56) References Cited

U.S. PATENT DOCUMENTS

| | | | |
|---|---|---|---|
| 2,367,350 A | | 1/1945 | Heigl |
| 4,475,595 A | * | 10/1984 | Watkins et al. ............. 166/272.3 |
| 4,476,930 A | * | 10/1984 | Watanabe ..................... 166/279 |
| 5,685,918 A | | 11/1997 | Tate |
| 5,762,821 A | | 6/1998 | Tate |
| 7,781,381 B2 | | 8/2010 | Ke et al. |
| 2005/0065036 A1 | | 3/2005 | Treybig et al. |
| 2005/0067576 A1 | * | 3/2005 | Caria ......................... 250/370.08 |
| 2009/0075844 A1 | | 3/2009 | Ke et al. |
| 2010/0089579 A1 | | 4/2010 | Reyes et al. |
| 2010/0261623 A1 | * | 10/2010 | Cassidy et al. ................. 507/243 |
| 2011/0259592 A1 | | 10/2011 | Reyes |
| 2012/0067576 A1 | | 3/2012 | Reyes et al. |
| 2012/0097392 A1 | | 4/2012 | Reyes et al. |
| 2012/0115759 A1 | | 5/2012 | Reyes |
| 2013/0112106 A1 | * | 5/2013 | Malwitz et al. ............. 106/14.42 |

FOREIGN PATENT DOCUMENTS

| | | |
|---|---|---|
| GB | 2 453 630 A | 4/2009 |
| WO | WO 2012/080296 A1 | 6/2012 |
| WO | WO 2012/080297 A1 | 6/2012 |
| WO | WO 2012/080298 A1 | 6/2012 |
| WO | WO 2012/080299 A1 | 6/2012 |
| WO | WO 2012/080463 A1 | 6/2012 |
| WO | 2013154710 A1 | 10/2013 |
| WO | 2014150701 A1 | 9/2014 |

OTHER PUBLICATIONS

Gelmboldt et al., "Two New 'Onium' Fluorosilicates, the Products of Interaction of Fluorosilicic Acid with 12-Membered Macrocycles: Structures and Spectroscopic Properties," Dalton Trans., 2007, 2915-2924.

Kumar et al., "Precipitation of Sodium Silicofluoride (Na2SiF6) and Cryolite (Na3AIF6) from HF/HCI Leach Liquors of Alumino-Silicates," Hydrometallurgy 104 (2010), 304-307.

Frayet et al., "Solubility of (NH4)2SiF6, K2SiF6 and Na2SiF6 in Acidic Solutions," Chemical Physics Letters 427 (2006) 356-364.

Busey et al., "Fluorosilicate Equilibria in Sodium Chloride Solutions from 0 to 60° C.+," Inorg. Chem. 1980, 19, 758-761.

Urbansky et al., "Can Fluoridation Affect Lead(II) in Potable Water? Hexafluorosilicate and Fluoride Equilibria in Aqueous Solution," Intern. J. Environ. Studies, 2000, vol. 57, pp. 597-637.

Urbansky, Edward Todd, "Fate of Fluorosilicate Drinking Water Additives," Chem. Rev. 2002, 102, 2837-2854.

Pevec et al., "The Variations in Hydrogen Bonding in Hexafluorosilicate Salts of Protonated Methyl Substituted Pyridines and Tetramethylethylenediamine," Journal of Fluorine Chemistry 129 (2008) 707-712.

Gelmboldt et al., "Hexafluorosilicates of bis(aminopyridinium). The Relationship Between H-Bonding System and Solubility of Salts," Journal of Fluorine Chemistry 130 (2009), 428-433.

Goanski, R.D., "Fluosilicate Solubilities Affect HF Acid Compositions," SPE 27404, 1994.

Acker et al., "Chemical Analysis of Acidic Silicon Etch Solutions II. Determination of HNO3, HF, and H2SiF6 by Icon Chromatography," Science Direct, Talanta 72, 2007, 1540-1545.

Zhang et al., "Use of the Anti-Scale Disperser to Reduce Scaling of Potassium/Sodium Fluorosilicate in the Filtration System for Phosphoric Acid," The Chemical Engineering Institute of Sichuan University, 2001.

International Search Report and Written Opinion for PCT/US2013/030174 dated Apr. 15, 2013.

Kalfayan, Leonard, "Production Enhancement with Acid Stimulation," 2000.

Kalfayan, Leonard, "Production Enhancement with Acid Stimulation," 2nd ed., 2008.

* cited by examiner

*Primary Examiner* — Zakiya W Bates
*Assistant Examiner* — Silvana Runyan
(74) *Attorney, Agent, or Firm* — McDermott Will & Emery LLP; Holly Soehnge

(57) ABSTRACT

Treatment fluids comprising a silicate complexing agent can be used in conjunction with acidizing a subterranean formation that contains a siliceous material. Inclusion of the silicate complexing agent in the treatment fluids may eliminate or reduce the production of insoluble fluorosilicates and aluminosilicates that can occur when an acidizing operation is conducted. Methods for treating a subterranean formation can comprise: introducing to a subterranean formation a treatment fluid that comprises a silicate complexing agent comprising a tertiary amine compound, a functionalized pyridine compound, any salt thereof, or any combination thereof; and hydrofluoric acid, a hydrofluoric acid-generating compound, or any combination thereof.

20 Claims, No Drawings

TREATMENT FLUIDS COMPRISING A SILICATE COMPLEXING AGENT AND METHODS FOR USE THEREOF

BACKGROUND

The present disclosure relates to matrix acidizing of subterranean formations, and, more specifically, to treatment fluids that can eliminate or reduce the production of insoluble fluorosilicates and aluminosilicates that may occur in conjunction with an acidizing operation.

Treatment fluids can be used in a variety of subterranean treatment operations. Such treatment operations can include, without limitation, drilling operations, stimulation operations, production operations, sand control treatments, and the like. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid or a component thereof. Illustrative treatment operations can include, for example, fracturing operations, gravel packing operations, acidizing operations, scale dissolution and removal, consolidation operations, and the like.

In acidizing operations, a subterranean formation containing an acid-soluble material can be treated with an acid to dissolve at least a portion of the material. Formation components of the formation matrix may comprise the acid-soluble material in some cases. In other cases, the acid-soluble material may have been deliberately introduced into the subterranean formation in conjunction with a stimulation operation (e.g., proppant particulates). Illustrative examples of formation components that may be dissolved by an acid include, for example, carbonates, silicates, and aluminosilicates. Dissolution of these formation components can desirably open voids and conductive flow pathways in the formation that can improve the formation's rate of hydrocarbon production, for example. In a similar motif, acidization may be used to remove like types of precipitation damage that can be present in the formation.

Carbonate formations often contain minerals that comprise a carbonate anion (e.g., calcite). When acidizing a carbonate formation, the acidity of the treatment fluid alone can be sufficient to solubilize the formation components. Both mineral acids (e.g., hydrochloric acid) and organic acids (e.g., acetic and formic acids) can be used to treat a carbonate formation, often with similar degrees of success.

Siliceous formations can include minerals such as, for example, zeolites, clays, and feldspars. Most sandstone formations, for example, contain about 40% to about 98% sand quartz particles (i.e., silica), bonded together by various amounts of cementing material including carbonates (e.g., calcite), aluminosilicates, and other silicates. As used herein, the term "siliceous" refers to a substance having the characteristics of silica, including silicates and/or aluminosilicates.

Acidizing a siliceous formation (e.g., a sandstone formation or a clay-containing formation) or a formation containing a siliceous material is thought to be considerably different than acidizing a carbonate formation. Specifically, the treatment of a siliceous formation with the treatment fluids commonly used for acidizing a carbonate formation may have little to no effect, because mineral acids and organic acids do not effectively react with siliceous materials. In contrast to mineral acids and organic acids, hydrofluoric acid can react very readily with siliceous materials to produce soluble substances. Oftentimes, a mineral acid or an organic acid can be used in conjunction with a hydrofluoric acid-containing treatment fluid to maintain the treatment fluid in a low pH state as the hydrofluoric acid becomes spent. In some instances, the low pH of the treatment fluid may promote initial silicon dissolution and aid in maintaining the silicon in a dissolved state. At higher subterranean formation temperatures (e.g., above about 200° F.), it may be undesirable to lower the pH much below about 1 due to mineral instability that can occur. Additionally, regardless of the formation temperature, corrosion can be an inevitable problem that occurs when very low pH treatment fluids are used.

Although low pH treatment fluids may be desirable to aid in silicon dissolution, precipitation of insoluble fluorosilicates and aluminosilicates can still become problematic in the presence of certain metal ions. Specifically, under low pH conditions (e.g., below a pH of about 3), dissolved silicon can react with Group 1 metal ions (e.g., $Na^+$ and $K^+$) to produce insoluble fluorosilicates and aluminosilicates. The terms "Group 1 metal ions" and "alkali metal ions" will be used synonymously herein. Other metal ions, including Group 2 metal ions (e.g., $Ca^{2+}$ and $Mg^{2+}$), may also be problematic in this regard. The precipitation of insoluble fluorosilicates and aluminosilicates can block pore throats and undo the desirable permeability increase initially achieved by the acidizing operation. That is, the formation of insoluble fluorosilicates and aluminosilicates can damage the subterranean formation. In many instances, the damage produced by insoluble fluorosilicates and aluminosilicates can be more problematic than if the acidizing operation had not been conducted in the first place. In contrast to many metal ions, ammonium ions ($NH_4^+$) are not believed to promote the formation of insoluble fluorosilicates and aluminosilicates. Accordingly, treatment fluids comprising an ammonium salt are frequently used in conjunction with acidizing a siliceous formation, as discussed further below.

Problematic alkali metal ions or other metal ions can come from any source including, for example, the treatment fluid, a component of the treatment fluid, or the subterranean formation itself. For example, the carrier fluid of a treatment fluid may contain some sodium or potassium ions unless costly measures (e.g., deionization) are taken to limit their presence. Alkali metal ions, in particular, are widely distributed in the environment and can be especially difficult to avoid completely when conducting a subterranean treatment operation. As discussed further below, a variety of strategies have been developed to address the most common sources of problematic metal ions encountered when conducting subterranean treatment operations.

One strategy that has been used with some success to avoid the damaging effects of metal ions includes introducing a sequence of pre-flush treatment fluids into the subterranean formation prior to performing an acidizing operation with a hydrofluoric acid-containing treatment fluid. For example, a pre-flush treatment fluid comprising a mineral acid or an organic acid can be used to dissolve acid-soluble formation components and remove at least a portion of the problematic metal ions from the formation. Thereafter, another pre-flush treatment fluid comprising an ammonium salt can be introduced into the subterranean formation to displace the remaining formation metal ions and leave the formation enriched in ammonium ions. Although this approach can be used successfully, it can considerably add to the time and expense needed to perform an acidizing operation.

Another strategy that can be used to mitigate the effects of metal ions in acidizing operations is to introduce a chelating agent into the subterranean formation. Although this strategy can be successful for Group 2 metal ions and transition metal ions, for example, chelation is believed to be somewhat less effective for alkali metal ions. In addition, many chelating agents are utilized in their salt form, which is many times their $Na^+$ or $K^+$ salt form. Thus, use of a chelating agent, although reducing precipitation effects from certain metal ions, can actually exacerbate the precipitation effects of alkali metal ions. Sometimes the free acid or ammonium salt forms of chelating agents can be used to avoid this issue, at least in principle, but the free acid and/or ammonium salt forms of many chelating agents are either unknown or not commercially available at a reasonable cost. Furthermore, many common chelating agents are not biodegradable or present other toxicity concerns that can make their use in a subterranean formation problematic.

SUMMARY OF THE INVENTION

The present disclosure relates to matrix acidizing of subterranean formations, and, more specifically, to treatment fluids that can eliminate or reduce the production of insoluble fluorosilicates and aluminosilicates that may occur in conjunction with an acidizing operation.

In some embodiments, the present invention provides a method comprising: providing a treatment fluid that comprises: a silicate complexing agent comprising a tertiary amine compound, a functionalized pyridine compound, any salt thereof, or any combination thereof; and hydrofluoric acid, a hydrofluoric acid-generating compound, or any combination thereof; and introducing the treatment fluid into a subterranean formation.

In some embodiments, the present invention provides a method comprising: providing a treatment fluid that comprises: a silicate complexing agent comprising a functionalized pyridine compound or any salt thereof; introducing the treatment fluid into a subterranean formation; and forming a complex of the silicate complexing agent and a fluorosilicate or an aluminosilicate in the subterranean formation.

In some embodiments, the present invention provides a method comprising: providing a treatment fluid having a pH ranging between about 0 and about 8 that comprises: a silicate complexing agent comprising a functionalized pyridine compound or any salt thereof; introducing the treatment fluid into a subterranean formation; and performing an acidizing operation in the subterranean formation.

The features and advantages of the present invention will be readily apparent to one having ordinary skill in the art upon a reading of the description of the preferred embodiments that follows.

DETAILED DESCRIPTION

The present disclosure relates to matrix acidizing of subterranean formations, and, more specifically, to treatment fluids that can eliminate or reduce the production of insoluble fluorosilicates and aluminosilicates that may occur in conjunction with an acidizing operation.

As described above, metal ions, especially alkali metal ions, can lead to a number of issues when present during an acidizing operation. Particularly in the presence of dissolved silicon (e.g., in the form of $SiF_4$, $SiF_6^-$, or $SiF_6^{2-}$), alkali metal ions can result in damaging alkali fluorosilicate precipitates. Current approaches to dealing with the issue of fluorosilicate and aluminosilicate precipitation can be costly and may be insufficient in some cases.

The present disclosure describes silicate complexing agents that can be included in treatment fluids to be used in conjunction with an acidizing operation. As used herein, the term "silicate complexing agent" refers to a compound that can form a reaction product with a dissolved silicon species. Such treatment fluids can further comprise hydrofluoric acid, a hydrofluoric acid-generating compound, or any combination thereof, or the treatment fluids can be introduced into a subterranean formation ahead of or subsequent to a treatment fluid comprising hydrofluoric acid, a hydrofluoric acid-generating compound, or any combination thereof. Without being bound by any theory or mechanism, it is believed that the silicate complexing agents can react with fluorosilicates or other forms of dissolved silicon produced during an acidizing operation, thereby producing a complex that is much less likely to precipitate, thereby damaging the formation. In some cases the complex may form particulates that are sufficiently small to be easily produced from the formation and limit damage thereto.

A number of advantages can be realized when using a treatment fluid that comprises a silicate complexing agent, as described herein. Although the treatment fluids described herein may be particularly advantageous when used in conjunction with an acidizing operation, they may be used at any stage during the treatment of a subterranean formation. For example, a treatment fluid comprising a silicate complexing agent may be used in conjunction with a stimulation operation (e.g., a fracturing operation), with a further stimulation operation being conducted at a later time (e.g., an acidizing operation using a treatment fluid comprising hydrofluoric acid and/or a hydrofluoric acid-generating compound). Such a treatment sequence may leave the subterranean formation desirably conditioned with the silicate complexing agent, such that fluorosilicate and aluminosilicate precipitation is less problematic once acidizing begins. In some embodiments of the present invention, a treatment fluid comprising a silicate complexing agent may be introduced into a subterranean formation before or subsequent to a treatment fluid comprising hydrofluoric acid, a hydrofluoric acid-generating compound, or any combination thereof. In more preferred embodiments of the present invention, the separate treatment fluids may be combined into a single-stage treatment fluid that comprises a silicate complexing agent and hydrofluoric acid, a hydrofluoric acid-generating compound, or any combination thereof.

A primary advantage of using a treatment fluid comprising a silicate complexing agent in conjunction with the treatment of a subterranean formation is that significantly fewer precautions may need to be taken to exclude alkali metal ions from the subterranean environment. For example, it may not be necessary to conduct a pre-flush treatment with an $NH_4^+$-containing treatment fluid prior to acidizing, or fewer pre-flush treatments may be needed. This can reduce the time and expense needed to conduct the acidizing operation. Likewise, there may be more tolerance for alkali metal ions in the carrier fluid used to formulate the treatment fluid, thereby allowing saltier water sources to be used.

Use of a treatment fluid that comprises a silicate complexing agent, as described herein, may also significantly expand the breadth of chelating agents that may be used in conjunction with treating a subterranean formation to sequester metal ions. Specifically, use of a silicate complexing agent may advantageously allow sodium or potassium salts of a chelating agent to be used in lieu of the free acid or ammonium salt forms, which may be unknown, not commercially available, or expensive. In this regard, some of the more common chelating agents known in the art are available in their ammonium salt forms, but the chelating agents are not biodegradable. In contrast, only a limited number of biodegradable chelating agents are available in their free acid or ammonium salt forms. Thus, use of a silicate complexing agent may allow a wider breadth of biodegradable chelating agents to be used in conjunction with an acidizing operation, which can improve the environmental profile of the acidizing operation and lower the costs associated with the chelating agent. Further discussion of biodegradable chelating agents follows hereinbelow.

In more specific embodiments of the present invention, the silicate complexing agents described herein may comprise a tertiary amine compound, a functionalized pyridine compound, any salt thereof, or any combination thereof. As used herein, the term "functionalized pyridine compound" refers to a pyridine compound that has at least one substituent attached to its ring carbon atoms. Functionalized pyridine compounds, in particular, can form a reaction product with hexafluorosilicate anions under appropriate reaction conditions. Applicant does not believe that there has been any recognition in the art to use the complex of a functionalized pyridine compound and a fluorosilicate anion or other dissolved silicon species as a way of mitigating precipitation of fluorosilicates and aluminosilicates, particularly within a subterranean formation. Without being bound by any theory or mechanism, it is believed that hydrofluoric acid may react with a siliceous material in a subterranean formation to produce a fluorosilicate anion or other dissolved silicon species. We have found that in the absence of a functionalized pyridine compound or other silicate complexing agent, fluorosilicate anions can react with alkali metal ions to produce insoluble alkali metal fluorosilicates. However, when a functionalized pyridine compound or other silicate complexing agent is present, the fluorosilicate anions may react with the functionalized pyridine compound to produce a functionalized pyridine-fluorosilicate complex. An alternative or parallel mechanism may involve the formation of a pyridinium salt in the presence of hydrofluoric acid, which may subsequently react with a siliceous material to produce a functionalized pyridine-fluorosilicate complex. In either case, we have found that formation of the complex may allow a reduced incidence of fluorosilicate and/or aluminosilicate precipitation to be realized when conducting subterranean treatment operations, particularly in the presence of alkali metal ions.

In some embodiments of the present invention, the treatment fluids described herein may comprise a silicate complexing agent comprising a tertiary amine compound, a functionalized pyridine compound, any salt thereof, or any combination thereof. In some embodiments, the treatment fluids may further comprise hydrofluoric acid, a hydrofluoric acid-generating compound, or any combination thereof. In some embodiments, the treatment fluids may further comprise a chelating agent.

In some embodiments of the present invention, the treatment fluids described herein may comprise a silicate complexing agent comprising a tertiary amine compound, a functionalized pyridine compound, any salt thereof, or any combination thereof; and hydrofluoric acid, a hydrofluoric acid-generating compound, or any combination thereof. In some embodiments, the treatment fluids may further comprise a chelating agent.

In some embodiments of the present invention, the treatment fluids described herein may comprise a silicate complexing agent comprising a functionalized pyridine compound or any salt thereof. In some embodiments, the treatment fluids may have a pH ranging between about 0 and about 8. In some embodiments, the treatment fluids may further comprise hydrofluoric acid, a hydrofluoric acid-generating compound, or any combination thereof. In some embodiments, the treatment fluids may further comprise a chelating agent.

In some embodiments of the present invention, the treatment fluids described herein may comprise a silicate complexing agent comprising a functionalized pyridine compound or any salt thereof; and hydrofluoric acid, a hydrofluoric acid-generating compound, or any combination thereof. In some embodiments, the treatment fluids described herein may have a pH ranging between about 0 and about 8. In some embodiments, the treatment fluids described herein may further comprise a chelating agent.

In some embodiments of the present invention, the treatment fluids described herein may comprise an aqueous carrier fluid as their continuous phase. Suitable aqueous carrier fluids may include, for example, fresh water, acidified water, salt water, seawater, brine (e.g., a saturated salt solution), or an aqueous salt solution (e.g., a non-saturated salt solution). Aqueous carrier fluids may be obtained from any suitable source. In some embodiments of the present invention, the treatment fluids described herein may comprise an aqueous carrier fluid that is substantially free of alkali metal ions or contains as low a concentration of alkali metal ions as attainable at a reasonable cost. Choice of a low salt or salt-free aqueous carrier fluid may allow a lower concentration of the silicate complexing agent to be used in the treatment fluid, allow saltier subterranean formations to be treated, and/or permit greater quantities of alkali metal salts of chelating agents to be used. One of ordinary skill in the art will be able to determine an acceptable working level of alkali metal ions that may be present in a treatment fluid, given the benefit of this disclosure. In general, as described herein, use of a silicate complexing agent in a treatment fluid may allow greater levity to be realized in choosing an aqueous carrier fluid for an acidizing fluid or other stimulation fluid than would otherwise be possible. In some embodiments of the present invention, the treatment fluid may further comprise a carrier fluid that comprises alkali metal ions. In other embodiments of the present invention, the treatment fluid may further comprise a carrier fluid that is substantially free of alkali metal ions.

In some or other embodiments of the present invention, the treatment fluid may comprise an organic solvent, such as hydrocarbons, as at least a portion of its continuous phase.

The volume of the carrier fluid to be used in the treatment fluids described herein may be dictated by certain characteristics of the subterranean formation being treated such as, for example, the quantity of siliceous material needing removal, the chemistry of the siliceous material, and the formation porosity. Determination of an appropriate volume of carrier fluid to be used in the treatment fluids may also be influenced by other factors, as will be understood by one having ordinary skill in the art.

In various embodiments of the present invention, the treatment fluids described herein may have a pH of about 8 or below. We believe that such pH values, and especially pH values of about 3 or below, may be effective for dissolving silicates and/or aluminosilicates in a siliceous formation and/or maintaining dissolved silicon in the treatment fluid. In addition, in embodiments in which a chelating agent is present, some chelating agents may be more effective in forming a metal complex that can sequester a metal ion at certain pH values as opposed to others. In some embodiments, the treatment fluids may have a pH ranging between about 0 and about 8. In other embodiments, the treatment fluids described herein may have a pH ranging between about 0 and about 6, or between about 0 and about 4, or between about 0 and about 2, or between about 1 and about 6, or between about 1 and about 4, or between about 2 and about 5, or between about 0 and about 3, or between about 3 and about 6. One of ordinary skill in the art will be able to determine an effective working pH for the treatment fluids to satisfactorily maintain silicon in a dissolved state through routine experimentation, given the benefit of this disclosure.

In some embodiments of the present invention, the silicate complexing agents described herein may comprise a functionalized pyridine compound. In some embodiments, suitable functionalized pyridine compounds may have a structure of

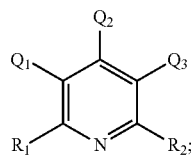

wherein $R_1$ and $R_2$ are independently selected from the group consisting of H, alkyl, aryl, cycloalkyl, heterocyclyl, heteroaryl, and $NR_3R_4$; wherein $R_3$ and $R_4$ are independently selected from the group consisting of H, alkyl, aryl, cycloalkyl, heterocyclyl, and heteroaryl; wherein $Q_1$, $Q_2$, and $Q_3$ are independently H or any substituent; and wherein $R_1$, $R_2$, $Q_1$, $Q_2$, and $Q_3$ are all not H. Illustrative examples of substituents that may comprise $Q_1$, $Q_2$, and $Q_3$ include, for example, alkyl, aryl, cycloalkyl, heterocyclyl, heteroaryl, halogen, carboxylic acid, OH, OR (R=alkyl or aryl), hydroxyalkyl, amino, substituted amino, and the like.

In more specific embodiments of the present invention, the functionalized pyridine compound may have a structure of

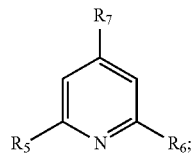

wherein $R_5$-$R_7$ are independently selected from the group consisting of H, alkyl, and $NR_8R_9$; wherein $R_8$ and $R_9$ are independently selected from the group consisting of H and alkyl; and wherein $R_5$, $R_6$, and $R_7$ are all not H. In some embodiments, suitable functionalized pyridine compounds may include, for example, 2-methylpyridine, 2,6-dimethylpyridine, 2,4,6-trimethylpyridine, 2-aminopyridine, 2,6-diaminopyridine, 2,4,6-triaminopyridine, and any combination thereof.

In various embodiments of the present invention, an amount of the functionalized pyridine compound in the treatment fluid may be at least about 5% by weight of the treatment fluid. In other various embodiments, an amount of the functionalized pyridine compound in the treatment fluid may be at least about 10% by weight of the treatment fluid.

In some embodiments of the present invention, the treatment fluids described herein can comprise hydrofluoric acid, a hydrofluoric acid-generating compound, or any combination thereof. In some or other embodiments, hydrofluoric acid, a hydrofluoric acid-generating compound, or any combination thereof may be present in a treatment fluid that is separate from a treatment fluid comprising the silicate complexing agent. Use of hydrofluoric acid and/or a hydrofluoric acid-generating compound may be advantageous when treating a siliceous subterranean formation or a subterranean formation containing a siliceous material. Suitable hydrofluoric acid-generating compounds may include, for example, fluoroboric acid, fluorosulfuric acid, hexafluorophosphoric acid, hexafluoroantimonic acid, difluorophosphoric acid, hexafluorosilicic acid, potassium hydrogen difluoride, sodium hydrogen difluoride, boron trifluoride acetonitrile complex, boron trifluoride acetic acid complex, boron trifluoride dimethyl ether complex, boron trifluoride diethyl ether complex, boron trifluoride dipropyl ether complex, boron trifluoride dibutyl ether complex, boron trifluoride t-butyl methyl ether complex, boron trifluoride phosphoric acid complex, boron trifluoride dihydrate, boron trifluoride methanol complex, boron trifluoride ethanol complex, boron trifluoride propanol complex, boron trifluoride isopropanol complex, boron trifluoride phenol complex, boron trifluoride propionic acid complex, boron trifluoride tetrahydrofuran complex, boron trifluoride piperidine complex, boron trifluoride ethylamine complex, boron trifluoride methylamine complex, boron trifluoride triethanolamine complex, polyvinylammonium fluoride, polyvinylpyridinium fluoride, pyridinium fluoride, imidazolium fluoride, ammonium fluoride, ammonium bifluoride, tetrafluoroborate salts, hexafluoroantimonate salts, hexafluorophosphate salts, bifluoride salts, and any combination thereof.

When used, a hydrofluoric acid-generating compound can be present in the treatment fluids described herein in an amount ranging between about 0.1% to about 20% by weight of the treatment fluid. In other embodiments, an amount of the hydrofluoric acid-generating compound can range between about 0.5% to about 10% by weight of the treatment fluid or between about 0.5% to about 8% by weight of the treatment fluid. Hydrofluoric acid, when present, may be used in similar concentration ranges.

In some embodiments of the present invention, another acid, an acid-generating compound, or any combination thereof can be present in the treatment fluids in addition to hydrofluoric acid and/or a hydrofluoric acid-generating compound. In some embodiments, the additional acid can be a mineral acid such as, for example, hydrochloric acid, or an organic acid such as, for example, acetic acid or formic acid. Other acids that also may be suitable for use include, for example, chloroacetic acid, dichloroacetic acid, trichloroacetic acid, or methanesulfonic acid. Examples of suitable acid-generating compounds can include, for example, esters, aliphatic polyesters, orthoesters, poly(ortho esters), poly (lactides), poly(glycolides), poly(ε-caprolactones), poly (hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate, and formate esters of pentaerythritol. Among other things, the additional acid or acid-generating compound can maintain the pH of the treatment fluids at a desired low level as the hydrofluoric acid or hydrofluoric acid-generating compound becomes spent. As described below, when a chelating agent is present, the additional acid or acid-generating compound may also help maintain the pH of the treatment fluids at a level where the chelating agent is more active for chelation to take place.

In some embodiments of the present invention, a chelating agent, an alkali metal salt thereof, a non-alkali metal salt thereof, or any combination thereof may be included in the treatment fluids. As described above, a chelating agent may be included in the treatment fluids, for example, when it is desirable to provide additional sequestration of metal ions (e.g., Group 2 metal ions or transition metal ions) in a subterranean formation. One of ordinary skill in the art will be able to choose an appropriate chelating agent and amount thereof to include in a treatment fluid intended for a particular application, given the benefit of the present disclosure.

In some embodiments of the present invention, the chelating agent may be biodegradable. Although use of a biodegradable chelating agent may be particularly advantageous in some embodiments of the present disclosure, there is no requirement to do so, and, in general, any suitable chelating agent may be used. As used herein, the term "biodegradable" refers to a substance that can be broken down by exposure to environmental conditions including native or non-native microbes, sunlight, air, heat, and the like. Use of the term "biodegradable" does not imply a particular degree of biodegradability, mechanism of biodegradability, or a specified biodegradation half-life.

In some embodiments of the present invention, suitable chelating agents may include common chelating agent compounds such as, for example, ethylenediaminetetraacetic acid (EDTA), propylenediaminetetraacetic acid (PDTA), nitrilotriacetic acid (NTA), N-(2-hydroxyethyl)ethylenediaminetriacetic acid (HEDTA), diethylenetriaminepentaacetic acid (DTPA), hydroxyethyliminodiacetic acid (HEIDA), cyclohexylenediaminetetraacetic acid (CDTA), diphenylaminesulfonic acid (DPAS), ethylenediaminedi(o-hydroxyphenylacetic) acid (EDDHA), glucoheptonic acid, gluconic acid, citric acid, any salt thereof, any derivative thereof, and the like. It is to be noted that NTA may be considered to be a biodegradable compound, but it may have undesirable toxicity issues.

In some embodiments of the present invention, suitable chelating agents may include biodegradable chelating agents such as, for example, glutamic acid diacetic acid (GLDA), methylglycine diacetic acid (MGDA), β-alanine diacetic acid (β-ADA), ethylenediaminedisuccinic acid, S,S-ethylenediaminedisuccinic acid (EDDS), iminodisuccinic acid (IDS), hydroxyiminodisuccinic acid (HIDS), polyamino disuccinic acids, N-bis[2-(1,2-dicarboxyethoxy)ethyl]glycine (BCA6), N-bis[2-(1,2-dicarboxyethoxy)ethyl]aspartic acid (BCA5), N-bis[2-(1,2-dicarboxyethoxy)ethyl]methylglycine (MCBA5), N-tris[(1,2-dicarboxyethoxy)ethyl]amine (TCA6), N-methyliminodiacetic acid (MIDA), iminodiacetic acid (IDA), N-(2-acetamido)iminodiacetic acid (ADA), hydroxymethyl-iminodiacetic acid, 2-(2-carboxyethylamino) succinic acid (CEAA), 2-(2-carboxymethylamino) succinic acid (CMAA), diethylenetriamine-N,N''-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl)aspartic acid, N-[2-(3-hydroxysuccinyl)]-L-serine, aspartic acid-N,N-diacetic acid, aspartic acid-N-monoacetic acid, any salt thereof, any derivative thereof, or any combination thereof.

When present, the chelating agent can comprise about 1% to about 50% by weight of the treatment fluid. In some embodiments, the chelating agent can comprise about 3% to about 40% by weight of the treatment fluid.

When a chelating agent is present, the acid dissociation constants of the chelating agent can dictate the pH range over which the treatment fluids can be most effectively used. GLDA, for instance, has a $pK_a$ value of about 2.6 for its most acidic carboxylic acid functionality. Below a pH value of about 2.6, dissolution of metal ions will be promoted primarily by the acidity of a treatment fluid containing GLDA, rather than by chelation, since the chelating agent will be in a fully protonated state. MGDA, in contrast, has a $pK_a$ value in the range of about 1.5 to 1.6 for its most acidic carboxylic acid group, and it will not become fully protonated until the pH is lowered to below this level. In this respect, MGDA can be particularly beneficial for use in acidic treatment fluids, since it can extend the acidity range by nearly a full pH unit over which the chelating agent is an active chelant. The lower pH of the treatment fluid can beneficially allow for a more vigorous acidizing operation to take place.

In some embodiments of the present invention, the silicate complexing agent can be used in treatment fluids in combination with other silica scale control additives. As used herein, the term "silica scale control additive" is any substance capable of suppressing silica scale build-up by increasing the solubility of dissolved silicon, inhibiting polymer chain propagation of dissolved silicon to produce precipitates, and/or decreasing the size and/or quantity of precipitates formed from dissolved silicon. Use of a silicate complexing agent in combination with a silica scale control additive in treatment fluids may beneficially provide a greater level of silicon solubilization than is possible using a conventional silica scale control additive alone. In addition, use of a silicate complexing agent may allow a conventional silica scale control additive to be used in a treatment fluid that contains at least some alkali metal ions and/or in a subterranean formation that contains alkali metal ions. In some embodiments, suitable conventional silica scale control additives may include, for example, phosphonates, aminocarboxylic acids, polyaminocarboxylic acids, polyalkyleneimines (e.g., polyethyleneimine), polyvinylamines, polyallylamines, polyallyldimethylammonium chloride, polyaminoamide dendrimers, any derivative thereof, and any combination thereof. Illustrative commercially available silica scale control additives include, for example, ACUMER 5000 (Rohm and Hass), and CLA-STA® XP and CLA-STA® FS (Halliburton Energy Services).

In some embodiments of the present invention, a suitable silica scale control additive that may be used in combination with a silicate complexing agent in the treatment fluids described herein can comprise an ortho-dihydroxybenzene compound (e.g., a catechol). Use of catechols, particularly tannic acid, for silica scale control is described in commonly owned U.S. Pat. No. 8,727,002, filed Dec. 14, 2010, which is incorporated herein by reference in its entirety.

In some embodiments of the present invention, the silicate complexing agent may be used in treatment fluids in combination with compounds that can sequester alkali metal ions. In some embodiments, suitable compounds that can sequester alkali metal ions may include, for example, crown ethers, aza-crown ethers, pseudocrown ethers, and any combination thereof. Further description of these compounds for sequestration of alkali metal ions, particularly for use in treating a subterranean formation, is provided in commonly owned U.S. patent application Ser. No. 13/444,897, now available as U.S. Patent Application Publication 2013/0269944, entitled "Treatment Fluids Comprising an Alkali Metal Complexing Agent and Methods for Use Thereof," filed concurrently herewith and incorporated herein by reference in its entirety.

Use of a silicate complexing agent in combination with a compound that sequesters alkali metal ions may be particularly advantageous for controlling silica scale in a subterranean formation, since it is believed that these two materials may operate by different mechanisms in inhibiting the production of insoluble silicon materials. As described above, it is believed that silicate complexing agents may interact with fluorosilicates in a manner that limits their ability to form insoluble materials in the presence of alkali metal ions. Compounds that sequester alkali metal ions, in contrast, may inhibit the reaction of alkali metal ions with fluorosilicates and/or reduce the quantities of alkali metal ions that are available for reaction with fluorosilicates. Thus, compounds that sequester alkali metal ions are believed to inhibit production of insoluble silicon materials without directly interacting with fluorosilicates or aluminosilicates themselves.

In additional embodiments of the present invention, the treatment fluids described herein may optionally further comprise any number of additives that are commonly used in treatment fluids including, for example, surfactants, gel stabilizers, anti-oxidants, polymer degradation prevention additives, relative permeability modifiers, scale inhibitors, corrosion inhibitors, foaming agents, defoaming agents, antifoaming agents, emulsifying agents, de-emulsifying agents, iron control agents, proppants or other particulates, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), gelling agents, lubricants, breakers, friction reducers, bridging agents, viscosifiers, weighting agents, solubilizers, pH control agents (e.g., buffers), hydrate inhibitors, consolidating agents, bactericides, catalysts, clay stabilizers, and the like. Combinations of these additives can be used as well.

In various embodiments of the present invention, the treatment fluids described herein comprising a silicate complexing agent may be used in conjunction with treating a subterranean formation. More specifically, in some embodiments, the treatment fluids may be used in conjunction with a stimulation operation conducted in a subterranean formation. In some embodiments, the stimulation operation can comprise a fracturing operation. In some or other embodiments, the stimulation operation can comprise an acidizing operation. In some embodiments, such an acidizing operation may be conducted using a treatment fluid that comprises hydrofluoric acid, a hydrofluoric acid-generating compound, or any combination thereof, particularly in a subterranean formation containing silicates and/or aluminosilicates. The silicates and/or aluminosilicates may be naturally occurring within the subterranean formation or be introduced during the course of treating the subterranean formation.

In some embodiments of the present invention, methods described herein can comprise: providing a treatment fluid that comprises a silicate complexing agent comprising a tertiary amine compound, a functionalized pyridine compound, any salt thereof, or any combination thereof; and hydrofluoric acid, a hydrofluoric acid-generating compound, or any combination thereof; and introducing the treatment fluid into a subterranean formation.

In some embodiments of the present invention, methods described herein can comprise: providing a treatment fluid that comprises a silicate complexing agent comprising a functionalized pyridine compound or any salt thereof; introducing the treatment fluid into a subterranean formation; and forming a complex of the silicate complexing agent and a fluorosilicate or an aluminosilicate in the subterranean formation. In some embodiments of the present invention, the treatment fluid can further comprise hydrofluoric acid, a hydrofluoric acid-generating compound, or any combination thereof.

In some embodiments of the present invention, methods described herein can comprise: providing a treatment fluid having a pH ranging between about 0 and about 8 that comprises a silicate complexing agent comprising a functionalized pyridine compound or any salt thereof; introducing the treatment fluid into a subterranean formation; and performing an acidizing operation in the subterranean formation. In some embodiments of the present invention, the treatment fluid can further comprise hydrofluoric acid, a hydrofluoric acid-generating compound, or any combination thereof.

In some embodiments of the present invention, performing an acidizing operation can comprise at least partially dissolving a portion of the subterranean formation. In some embodiments of the present invention, the subterranean formation can comprise a siliceous formation, such as, for example, a sandstone formation. In some embodiments of the present invention, the formation can comprise a matrix that is substantially non-siliceous but contains a siliceous material therein (e.g., introduced proppant particulates).

In some embodiments of the present invention, the use of a silicate complexing agent in a subterranean treatment operation may reduce or eliminate the formation of insoluble fluorosilicates or aluminosilicates in a subterranean formation, relative to a like treatment fluid lacking the silicate complexing agent. As used herein, the term "like treatment fluid" refers to a treatment fluid having a similar composition to another treatment fluid but lacking at least one component thereof. That is, treatment fluids described herein may reduce or eliminate the formation of insoluble fluorosilicates compared to a treatment fluid of similar composition that otherwise lacks the silicate complexing agent. In some embodiments of the present invention, the silicate complexing agent may increase the effective solubility of alkali metal fluorosilicates by forming a complex therewith.

In some embodiments of the present invention, the treatment fluids described herein may be used in stimulating a subterranean formation. In some embodiments of the present invention, such stimulating may comprise an acidizing operation, particularly an acidizing operation conducted in a siliceous formation. In some or other embodiments of the present invention, treatment fluids described herein may be used in other types of subterranean treatment operations. For example, in some embodiments, the treatment fluids may be used during drilling or while performing a stimulation operation, including fracturing, acidizing, and the like in a subterranean formation.

When used in conjunction with a stimulation operation, particularly an acidizing operation, an acid (e.g., hydrofluoric acid, a hydrofluoric acid-generating compound, or any combination thereof) may be combined with a silicate complexing agent in a treatment fluid, in some embodiments of the present invention. That is, the silicate complexing agent and the hydrofluoric acid and/or hydrofluoric acid-generating compound are introduced into the subterranean formation together in such embodiments. In such embodiments, the treatment fluid may also be used to perform a combined stimulation operation such as, for example, a fracture-acidizing treatment, if the introduction pressure is sufficiently high.

In other embodiments of the present invention, the silicate complexing agent and the hydrofluoric acid and/or hydrofluoric acid-generating compound may be placed in separate treatment fluids. In such embodiments, the treatment fluid comprising the silicate complexing agent may be introduced before, concurrently with, or after the treatment fluid comprising hydrofluoric acid and/or a hydrofluoric acid-generating compound. In some embodiments of the present invention, a treatment fluid comprising a silicate complexing agent may be introduced into a subterranean formation before a treatment fluid that comprises hydrofluoric acid, a hydrofluoric acid-generating compound, or any combination thereof. In such embodiments, the subterranean formation can be left in a condition that disfavors precipitation of alkali metal fluorosilicates once acidizing begins. For example, a treatment fluid comprising a silicate complexing agent may be used in a hydraulic fracturing operation to create or extend at least one fracture in a subterranean formation. Depending on other operational considerations, other types of stimulation operations can be conducted prior to acidizing taking place. In some or other embodiments, a treatment fluid comprising a silicate complexing agent may be introduced into a subterranean formation after a treatment fluid that comprises hydrofluoric acid, a hydrofluoric acid-generating compound, or any combination thereof. In some embodiments of the present invention, a treatment fluid comprising a silicate complexing agent and a treatment fluid that comprises hydrofluoric acid, a hydrofluoric acid-generating compound, or any combination thereof may be introduced concurrently into a subterranean formation. Optionally, any of these treatment operations can be followed by further treatment operations.

In some embodiments of the present invention, the treatment fluids described herein may be used in conjunction with an acidizing operation performed in a subterranean formation, particularly a subterranean formation that comprises a siliceous mineral or has had a siliceous material introduced thereto. In some embodiments of the present invention, the subterranean formation being treated by the acidizing operation can comprise a sandstone and/or a clay-containing formation. In some or other embodiments of the present invention, the subterranean formation can have had a silicate or an aluminosilicate (i.e., a siliceous material) introduced thereto. For example, in a fracturing operation, sand particulates (a silicate) or a ceramic propping material may be introduced to the subterranean formation. These introduced siliceous materials may be effectively treated according to the methods described herein as well.

In some embodiments of the present invention, acidizing operations or other stimulation operations conducted using the present treatment fluids may be performed in the absence of an $NH_4^+$ salt. As described above, use of a silicate complexing agent in a treatment fluid that encounters fluorosilicates or aluminosilicates may allow at least some alkali metal ions to be present. In some embodiments of the present invention, the treatment fluids described herein may be substantially free of $NH_4^+$ ions. In other embodiments of the present invention, the treatment fluids described herein may comprise an $NH_4^+$ salt or be used in conjunction with another treatment fluid that comprises an $NH_4^+$ salt. For example, one might choose to use a treatment fluid comprising an $NH_4^+$ salt in conjunction with a treatment fluid comprising a silicate complexing agent if the amount of alkali metal ions in the subterranean formation is high enough that the silicate complexing agent alone cannot effectively reduce or eliminate the formation of insoluble fluorosilicates or aluminosilicates when performing an acidizing operation.

In some embodiments of the present invention, the treatment fluids described herein may be used in treating a particulate pack in a subterranean formation. Particulate packs may include, for example, proppant packs and gravel packs. Treatment of a particulate pack with a treatment fluid comprising a silicate complexing agent may beneficially allow the permeability of the pack to be increased, such that it presents a lower impediment to fluid flow.

In some or other embodiments of the present invention, the treatment fluids described herein may be used in remediation operations within a subterranean formation. Specifically, in some embodiments, treatment fluids comprising a silicate complexing agent may be used to remove precipitation or accumulation damage within a subterranean formation. As used herein, the term "precipitation or accumulation damage" refers to a siliceous material that has been dissolved in a subterranean formation and deposited elsewhere within the subterranean formation.

To facilitate a better understanding of the present invention, the following examples of preferred embodiments are given. In no way should the following examples be read to limit, or to define, the scope of the invention.

EXAMPLES

Example 1

Effect of 2,6-Diaminopyridine on Fluorosilicate Precipitation

Control: 25 mL of 1 M aqueous $H_2SiF_6$ solution was combined with 10 mL of water and 20 mL of 2 M aqueous NaCl solution. After addition of the NaCl solution, the combined mixture turned slightly cloudy. Thereafter, a further 20 mL of 1 M $H_2SiF_6$ solution was added. The combined mixture then became very cloudy, and a precipitate settled over time. Trial 1: 4 mL of 2 M aqueous NaCl solution was combined with 18 mL of 1 M aqueous 2,6-diaminopyridine solution. To this solution was added 9 mL of 1 M aqueous $H_2SiF_6$ solution. No precipitate formed over two hours of observation. Trial 2: 9 mL of 1 M aqueous $H_2SiF_6$ solution was combined with 18 mL of 1 M aqueous 2,6-diaminopyridine solution. To this solution was added 4 mL of 2 M aqueous NaCl solution. Again, no precipitate formed over two hours of observation.

The foregoing tests indicate that precipitation occurred rapidly in the absence of a silicate complexing agent. However, when a silicate complexing agent (2,6-diaminopyridine) was present, precipitation was inhibited for a period of time.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
combining a functionalized pyridine compound, and
hydrofluoric acid, a hydrofluoric acid-generating compound, or any combination thereof, thereby forming a treatment fluid comprising a silicate complexing agent;
wherein the functionalized pyridine compound has a structure of

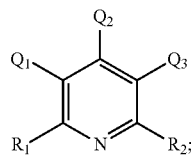

wherein $R_1$ and $R_2$ are independently selected from the group consisting of H, alkyl, aryl, cycloalkyl, heterocyclyl, heteroaryl, and $NH_2$;
wherein $Q_1$, $Q_2$, and $Q_3$ are independently H or any substituent; and
wherein $R_1$, $R_2$, $Q_1$, $Q_2$, and $Q_3$ are not all H; and
introducing the treatment fluid into a subterranean formation.

2. The method of claim 1, further comprising:
forming a complex of the silicate complexing agent and a fluorosilicate or an aluminosilicate in the subterranean formation.

3. The method of claim 1, wherein the treatment fluid further comprises a carrier fluid comprising alkali metal ions.

4. The method of claim 1, wherein the treatment fluid further comprises a chelating agent, an alkali metal salt of a chelating agent, a non-alkali metal salt of a chelating agent, or any combination thereof.

5. The method of claim 1, wherein the treatment fluid has a pH of about 8 or less.

6. The method of claim 1, wherein the treatment fluid has a pH ranging between about 0 and about 8.

7. A method comprising:
combining a carrier fluid with a functionalized pyridine compound, thereby forming a treatment fluid comprising a silicate complexing agent;
wherein the functionalized pyridine compound has a structure of

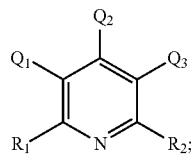

wherein $R_1$ and $R_2$ are independently selected from the group consisting of H, alkyl, aryl, cycloalkyl, heterocyclyl, heteroaryl, and $NH_2$;
wherein $Q_1$, $Q_2$, and $Q_3$ are independently H or any substituent; and
wherein $R_1$, $R_2$, $Q_1$, $Q_2$, and $Q_3$ are not all H;
introducing the treatment fluid into a subterranean formation; and
forming a complex of the silicate complexing agent and a fluorosilicate or an aluminosilicate in the subterranean formation.

8. The method of claim 7, wherein the treatment fluid has a pH ranging between about 0 and about 8.

9. The method of claim 7, wherein the treatment fluid further comprises hydrofluoric acid, a hydrofluoric acid-generating compound, or any combination thereof.

10. The method of claim 7, wherein the treatment fluid comprising the silicate complexing agent is introduced into the subterranean formation before or after a treatment fluid that comprises hydrofluoric acid, a hydrofluoric acid-generating compound, or any combination thereof.

11. The method of claim 7, wherein the functionalized pyridine compound comprises a compound selected from the group consisting of 2-methylpyridine, 2,6-dimethylpyridine, 2,4,6-trimethylpyridine, 2-aminopyridine, 2,6-diaminopyridine, and any combination thereof.

12. The method of claim 7, wherein the carrier fluid comprises alkali metal ions.

13. The method of claim 7, wherein the treatment fluid further comprises a chelating agent, an alkali metal salt of a chelating agent, a non-alkali metal salt of a chelating agent, or any combination thereof.

14. The method of claim 7, further comprising:
performing a stimulation operation in the subterranean formation, treating a particulate pack in the subterranean formation, remediating precipitation or accumulation damage within the subterranean formation, or any combination thereof.

15. A method comprising:
forming a treatment fluid having a pH ranging between about 0 and about 8 from a carrier fluid and a functionalized pyridine compound, the treatment fluid comprising a silicate complexing agent;
wherein the functionalized pyridine compound has a structure of

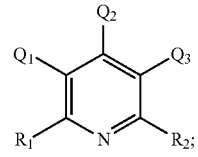

wherein $R_1$ and $R_2$ are independently selected from the group consisting of H, alkyl, aryl, cycloalkyl, heterocyclyl, heteroaryl, and $NH_2$,
wherein $Q_1$, $Q_2$, and $Q_3$ are independently H or any substituent; and
wherein $R_1$, $R_2$, $Q_1$, $Q_2$, and $Q_3$ are not all H;
introducing the treatment fluid into a subterranean formation; and
performing an acidizing operation in the subterranean formation.

16. The method of claim 15, wherein the acidizing operation is performed in the absence of an NH4+ salt.

17. The method of claim 15, wherein the treatment fluid further comprises hydrofluoric acid, a hydrofluoric acid-generating compound, or any combination thereof.

18. The method of claim 15, wherein the treatment fluid comprising the silicate complexing agent is introduced into the subterranean formation before or after a treatment fluid that comprises hydrofluoric acid, a hydrofluoric acid-generating compound, or any combination thereof.

19. The method of claim 15, wherein the carrier fluid comprises alkali metal ions.

20. The method of claim 15, wherein the treatment fluid further comprises a chelating agent, an alkali metal salt of a chelating agent, a non-alkali metal salt of a chelating agent, or any combination thereof.

* * * * *